Sept. 30, 1930.　　　D. A. DART　　　1,776,890
LUNCH CABINET
Filed Dec. 21, 1928　　　2 Sheets-Sheet 1

Inventor
D. A. Dart.
By Lacey & Lacey, Attorneys

Sept. 30, 1930.  D. A. DART  1,776,890
LUNCH CABINET
Filed Dec. 21, 1928  2 Sheets-Sheet 2

Inventor
D. A. Dart.
By Lacey & Lacey,
Attorneys

Patented Sept. 30, 1930

1,776,890

UNITED STATES PATENT OFFICE

DAVID A. DART, OF SALIDA, COLORADO

LUNCH CABINET

Application filed December 21, 1928. Serial No. 327,717.

The present invention is directed to improvements in lunch cabinets.

The primary object of the invention is to provide a device of this character especially designed for attachment to an automobile in advance of the radiator thereof.

Another object of the invention is to provide a device of this character so constructed that it can be conveniently attached to or removed from the automobile, as desired.

Another object of the invention is to provide a novel form of frame adapted to be supported by the bumper and bib plate of an automobile, the construction of the frame being such that the cabinet can be easily and quickly secured thereto or removed therefrom.

Another object of the invention is to provide a cabinet so constructed that articles of table ware, and food can be conveniently stored therein.

Another object of the invention is to provide a device of this character so constructed that the supporting frame thereof will be held against collapsing when the cabinet is engaged therewith, said frame being readily collapsible upon removal of the same from the automobile and after the cabinet has been removed from the frame.

With these and other objects in view, this invention resides in the novel features of construction, formation, combination and arrangement of parts to be hereinafter more fully described, claimed and illustrated in the accompanying drawing, in which:—

Figure 1:
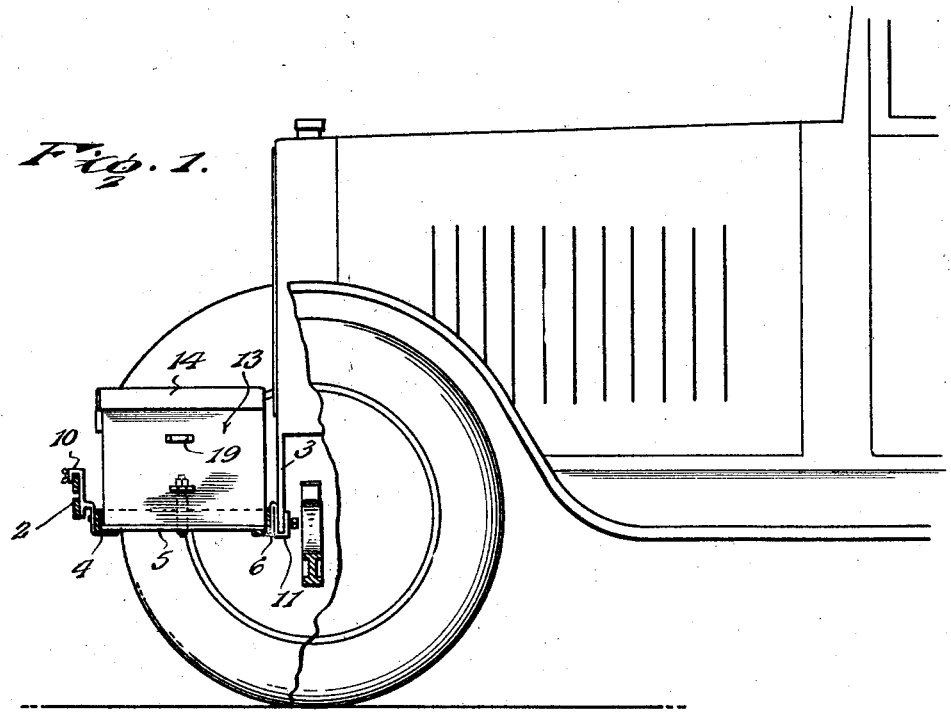
Figure 1 is a side elevation of a part of an automobile, showing the cabinet in place thereon, the supporting frame of the cabinet being shown in section.

Referring to the drawing, 1 designates a frame adapted to be mounted between the bumper 2 and bib plate 3 of an automobile. The frame comprises a front bar 4, side bars 5, and a rear bar 6, the respective bars being formed from angle iron.

The side bars 5 have their forward ends pivotally connected, as at 7, to the front bar 4, the rear ends of said bars having studs 8 carried thereby for detachable engagement in the key hole slots 9 formed in the ends of the rear bar 6, the purpose of which will be later explained.

The front bar 4 has fixed thereto clamps 10 for engagement with the bumper 2, the rear bar having a pair of clamps 11 for engagement with the bib plate 3, there being bolts 12 fixed to the side bars 5.

The cabinet 13 is preferably formed from comparatively light wood and includes a hingedly connected cover 14; it being of course understood that other material may be substituted for the wood if found more desirable. The cabinet may be covered with leather or other suitable material, and has secured to its sides fabric sheets 15 to provide pockets 16 in which plates, saucers, and the like can be conveniently stored. The cover has secured to its inner surface straps 17 in order that the roll 18 can be held in place, said roll being adapted to contain knives, forks and spoons. Obviously foods of various kinds may be placed in the cabinet and access can be conveniently had thereto.

The sides of the cabinet have handles 19 mounted thereon in order that the cabinet can be conveniently carried, and lifted from or placed upon the frame.

When the frame 1 is rigidly mounted upon the automobile the cabinet is placed thereon, and owing to the fact that the respective bars of the frame are formed from angle iron the cabinet will be properly sustained.

Figure 2:
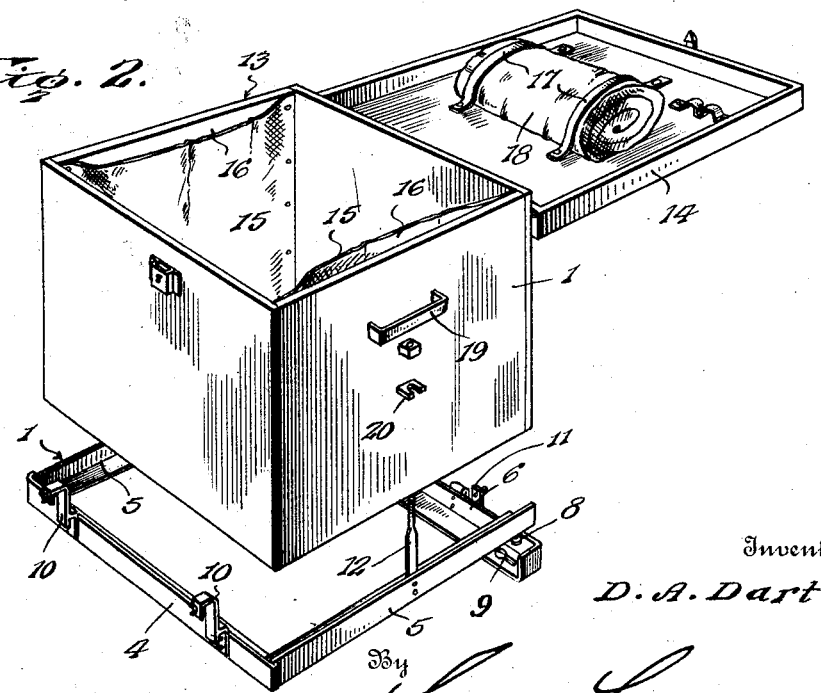
Figure 2 is a perspective view, showing the cooperative parts in non-assembled relation.
Figure 3:
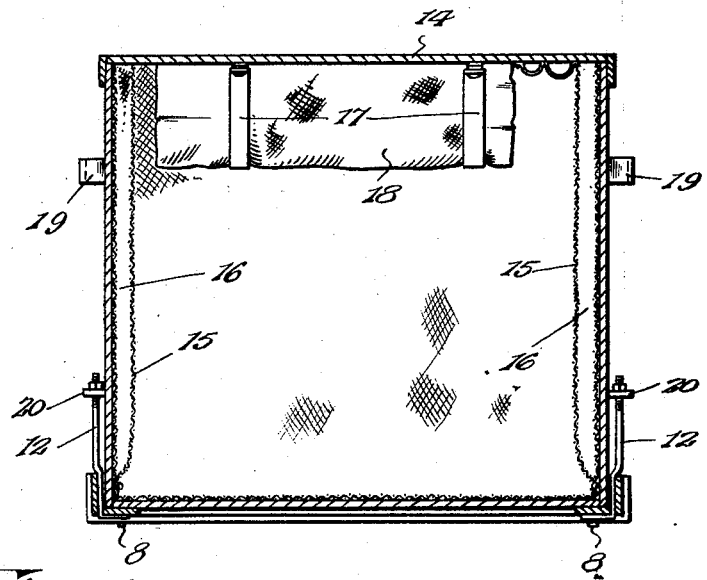
Figure 3 is a vertical sectional view through the device.
Figure 4:
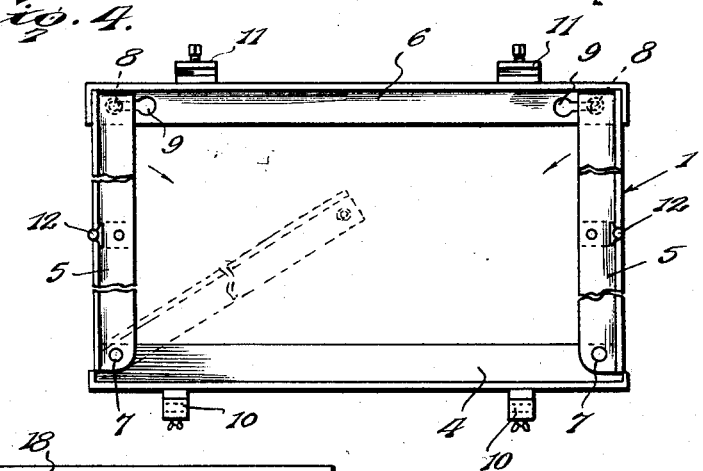
Figure 4 is a top plan view of the frame.
Figure 5:
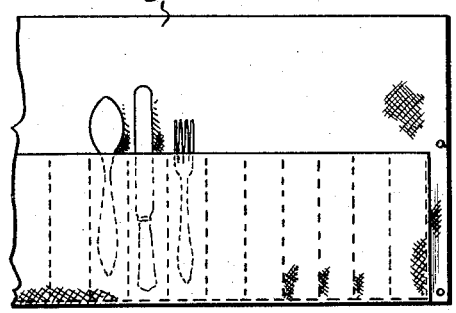
Figure 5 is a fragmentary plan view of the roll for containing the knives, forks, spoons, etc.

To firmly secure the cabinet upon the frame 1, the sides thereof are provided with cleats 20 with which the bolts 12 cooperate, as shown in Figures 2 and 3 of the drawing.

In case the automobile is not equipped with a bumper, the frame 1 is eliminated, and in which instance the cabinet may have its sides and rear provided with clamps for engaging the usual springs and bib plate.

By employing the slots 9 and detachably securing the studs 8 therein, the side bars 5 can be conveniently folded when the frame is not in use. It will be noted that when the cabinet is engaged with the frame the side bars cannot swing on their pivotal connection, but when the cabinet is removed, they can be conveniently swung upon disengaging the studs 8 from the slots 9.

Obviously the cabinet can be easily and quickly removed from the frame upon disengaging the bolts 12 from the cleats 20, in order that the cabinet can be removed from the automobile when it is desired to use the contents thereof.

From the foregoing, it is thought that the construction, operation and many advantages of the herein described invention will be apparent to those skilled in the art, without further description, and it will be understood that various changes in the size, shape, and proportion and minor details of construction may be resorted to without departing from the spirit or sacrificing any of the advantages of the invention.

What is claimed is:—

1. A device of the class described, comprising a frame consisting of a front bar and a rear bar, side bars pivotally connected with the front bar and detachably connected with the rear bar, means for detachably securing the frame to the bumper and bib plate of an automobile, a cabinet removably engaged with the frame, means for detachably securing the cabinet to the frame, said cabinet serving, when engaged upon the frame to prevent pivotal movement of the side bars.

2. A device of the class described, comprising a frame, said frame consisting of a front bar and a rear bar, side bars having their forward ends pivotally connected to the front bar, said side bars having studs upon their rear ends, said rear bar having slots therein for detachably engaging the studs to prevent folding of the frame, means carried by the frame for detachably securing the same to a bumper and bib plate of an automobile, a cabinet detachably secured to the frame, said cabinet, when engaged upon the frame, preventing disengagement of the studs and slots.

3. A device of the class described, comprising a frame for detachable engagement with the bumper and bib plate of an automobile, said frame comprising front and rear bars, side bars pivotally connected with the front bar, and detachably engaged with the rear bar, bolts carried by the side bars, a cabinet removably mounted upon the frame and having cleats for engaging the bolts to secure the cabinet to the frame, said cabinet, when engaged upon the frame serving to prevent pivotal movement of the side bars.

In testimony whereof I affix my signature.

DAVID A. DART. [L. S.]